(12) United States Patent
Sprau

(10) Patent No.: US 8,029,346 B2
(45) Date of Patent: Oct. 4, 2011

(54) COMBINE WITH GRAIN TANK EXTENSIONS

(75) Inventor: Heinz Sprau, Walshausen (DE)

(73) Assignee: Deere & Company, Moline, IL (US)

( * ) Notice: Subject to any disclaimer, the term of this patent is extended or adjusted under 35 U.S.C. 154(b) by 59 days.

(21) Appl. No.: 12/432,048

(22) Filed: Apr. 29, 2009

(65) Prior Publication Data

US 2009/0270149 A1    Oct. 29, 2009

(30) Foreign Application Priority Data

Apr. 29, 2008    (DE) .................. 10 2008 001 457

(51) Int. Cl.
*A01D 90/10* (2006.01)
*A01F 12/60* (2006.01)

(52) U.S. Cl. ......................................... 460/23; 460/119

(58) Field of Classification Search .................. 460/23, 460/119; 56/473.5; 296/7, 15, 26.15, 100.06, 296/100.1; 220/1.5, 6, 562, 666
See application file for complete search history.

(56) References Cited

U.S. PATENT DOCUMENTS

| | | | |
|---|---|---|---|
| 1,534,337 A * | 4/1925 | Watson ...................... 296/24.33 |
| 4,139,230 A * | 2/1979 | Barrentine et al. .......... 296/26.15 |
| 4,466,549 A * | 8/1984 | Hanaway ..................... 220/4.03 |
| 4,960,300 A * | 10/1990 | Burvee ............................ 296/34 |
| 5,151,064 A * | 9/1992 | Damman et al. ................. 460/23 |
| 6,074,298 A * | 6/2000 | Majkrzak et al. ............. 460/119 |
| 6,206,779 B1 * | 3/2001 | Gerber et al. .................... 460/23 |
| 6,508,705 B1 * | 1/2003 | Van Overschelde ............ 460/23 |
| 6,679,772 B2 * | 1/2004 | Johnson et al. .................. 460/23 |
| 6,692,352 B2 * | 2/2004 | Gerber et al. .................. 460/119 |
| 6,752,715 B2 * | 6/2004 | Stephens et al. ................ 460/23 |
| 7,018,290 B2 * | 3/2006 | Ramon et al. ................. 460/119 |
| 7,101,280 B2 * | 9/2006 | Colpaert ....................... 460/119 |
| 7,585,214 B1 * | 9/2009 | Johnson et al. ................ 460/119 |
| 7,645,109 B2 * | 1/2010 | Stukenholtz et al. ......... 414/505 |
| 2006/0240884 A1 * | 10/2006 | Klimmer ....................... 460/119 |
| 2008/0265601 A1 * | 10/2008 | Mohr et al. ..................... 296/15 |

FOREIGN PATENT DOCUMENTS

| | | |
|---|---|---|
| DE | 1951498 A | 10/1969 |
| DE | 4120731 A1 | 12/1992 |
| DE | 4320565 A1 | 1/1995 |

(Continued)

OTHER PUBLICATIONS

Belgian office action with Search Report.

*Primary Examiner* — Thomas Will
*Assistant Examiner* — Joan Misa

(57) ABSTRACT

A combine (10) includes a support frame (12) that can be moved across a field in a forward operating direction and a grain tank (42) fastened to it. The grain tank (42) is provided with side walls (58) that can be moved by means of an adjusting drive (68) between a retracted position for operation on public roads and for the storage of the combine (10) and an extended position for the harvesting operation. Each side wall (58) is connected in the upward direction with a cover (84) that is a component of a ring-shaped grain tank extension. The grain tank extension can be moved between an extended position in which it forms a ring that enlarges the grain tank (42) in the upward direction, and a retracted position, in which it encloses the grain tank (42) in the upward direction.

14 Claims, 3 Drawing Sheets

FOREIGN PATENT DOCUMENTS

| | | |
|---|---|---|
| DE | 4333558 C1 | 1/1995 |
| DE | 10051096 A1 | 10/2000 |
| EP | 0458032 A2 | 11/1991 |
| GB | 2296175 A | 6/1996 |
| JP | 03022918 A * | 1/1991 |
| JP | 03169779 A * | 7/1991 |
| JP | 04320619 A * | 11/1992 |
| JP | 05023040 A * | 2/1993 |
| JP | 05076239 A * | 3/1993 |
| JP | 06078627 A * | 3/1994 |
| JP | 06205610 A * | 7/1994 |
| JP | 06237638 A * | 8/1994 |
| JP | 06292450 A * | 10/1994 |

\* cited by examiner

COMBINE WITH GRAIN TANK EXTENSIONS

FIELD OF THE INVENTION

The invention concerns a combine with a support frame that can be moved across a field in a forward operating direction and a grain tank fastened to the support frame that includes two side walls that can be moved between a retracted position and an extended position by means of an adjustment drive and includes two covers, each of which extends the side wall and follows the side walls upward and can be moved between a retracted position and an extended position.

BACKGROUND OF THE INVENTION

In combines the threshed out, cleaned harvested crop is stored temporarily in a grain tank and is transferred to a transport vehicle by means of an unloading conveyor when a sufficiently high fill has been reached. Since the permissible dimensions of a combine are limited by over the road regulations, grain tanks of larger combines are provided with extension elements that increase the volume of the grain tank during the harvesting process.

Such a grain tank with a ring-shaped extension is described in patent publication no. DE 100 51 096 A. There four elements, of which two are made of flexible material, are pivoted through 90° or more between a flat position and an extended position. U.S. Pat. No. 6,508,705 B proposes a cover arrangement for a grain tank that include two covers connected to each other so as to pivot on two sides of the grain tank. The two other sides of the grain tank extension can be pivoted between a horizontal non-operating position and a vertical operating position. In both publications cited the extension of the grain tank is performed only upward. This has the disadvantage, among others, that the center of gravity of the combine is relatively high when the grain tank is loaded which has the effect of decreasing the steering capabilities during operation around curves and on side slopes. Moreover, the volume of the grain tank extension is limited by its relatively small base surface area.

Patent publication no. DE 1 951 498 A, which is seen as forming a class, describes another combine in which the outer side walls of the grain tank can be pivoted outward to increase the volume of the grain tank during the harvesting process. The upper cover of the additional volume being formed at the sides of the combine is also moved outward so that the grain tank is covered in the upward direction at all times. This leads to the disadvantage that the added supplementary volume remains relatively small.

What is needed is a grain tank for a combine that offers a lower center of gravity and/or a larger additional volume. It is an object of the invention to provide such a grain tank.

SUMMARY OF THE INVENTION

In accordance with a first aspect of the invention, a combine includes a support frame that can be moved across a field in a forward operating direction and a grain tank fastened to it. The grain tank has side walls that can be moved by means of an adjustment drive between a retracted position for operation on public roads or for parking of the combine and an extended position for the harvesting operation. Each side wall extends upward in a cover that is a component of a ring-shaped grain tank extension. The grain tank extension can be moved between an extended position, in which it forms a ring enlarging the grain tank in the upward direction, and a retracted position in which it covers the grain tank in the upward direction. In this way, the result is an enlargement of the volume of the grain tank and an enlargement of the base plane area of the grain tank extension. The additional volume applied in this way is accordingly enlarged considerably without moving the center of gravity significantly in the upward direction.

In a preferred embodiment the side walls are connected in joints at their lower end to the support frame about an axes extending in the forward operating direction. In the retracted position they extend upward from the axis and in the extended position they extend at an angle outward and upward from the axis. In the retracted position he side walls extend vertically upward. In another embodiment the side wall may also be a component of a drawer that can be shifted to the side.

In the extended position, the covers preferably extend at an angle upward and outward, in particular, parallel to the side walls. For this purpose they may be connected in joints at their lower end to the side walls pivoted about an axis extending horizontally and parallel to the forward operating direction. In the retracted position the cover preferably extends horizontally and covers the grain tank partially or completely in the upper direction.

In addition to the (second) covers described previously, the grain tank extension preferably also includes (first) covers at the front and rear sides of the grain tank that extend transverse to the forward operating direction and are connected in joints at their lower ends to axes extending horizontally and transverse to the forward operating direction. The first and second covers are connected to each other by end face walls that extend transverse to the forward operating direction. The end face walls preferably consist of material that is flexible in itself and the end face walls, on either side, are connected to each other by means of a spring or expander rope in order to provide a defined folding.

BRIEF DESCRIPTION OF THE DRAWINGS

The drawings herein show an embodiment of the invention that shall be described in greater detail in the following.

DETAILED DESCRIPTION OF THE PREFERRED EMBODIMENTS

Figure 1:
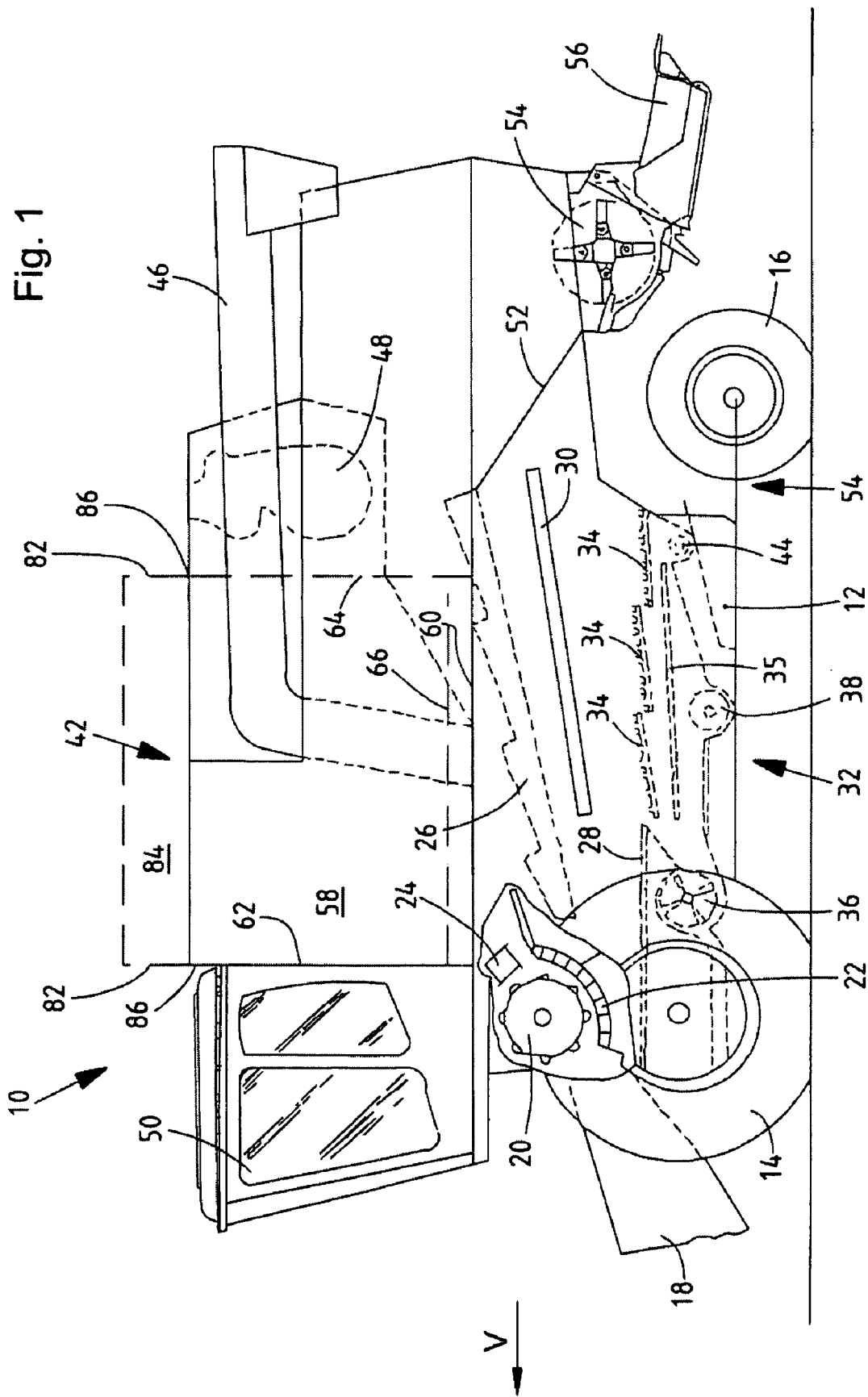
FIG. 1 shows schematic side view of a combine with a grain tank arrangement according to the invention.

FIG. 1 shows a self propelled combine 10 with a support frame 12 that is supported on the ground by front driven wheels 14 and rear steerable wheels 16 and is propelled by these. The wheels 14, 16 are brought into rotation by propulsion devices not shown in order to move the combine 10 for example over a field that is to be harvested. A harvested crop recovery arrangement (not shown) in the form of a cutter head or a corn picker or the like can be connected to the forward end region of the combine 10 in order to harvest crop from the field and to conduct it upward and to the rear by means of a slope conveyor 18 to a threshing arrangement with a thresher drum 20 arranged in the transverse direction and a thresher rasp 22 associated with it. The harvested crop is conducted over a deflecting drum 24 and to a straw shaker 26. In the following all directions such as forward, rear, above and below refer to the forward operating direction V of the combine 10.

Kernels and chaff that are separate during the threshing process fall to a preparation chute 28. Kernels and chaff, that are separated by the straw shaker 26 on the other hand, fall to a shaker chute 30 that guides them to the preparation chute 28. The preparation chute 28 conveys the kernels and chaff to sieves 34 arranged within a cleaning arrangement 32, which is associated with a blower 36 that supports the separation of the chaff from the kernels. Cleaned kernels are conducted to an elevator 40 (not shown) by means of a conveyor 38 that conveys it to a grain tank 42. A diagonal screw conveyor 44 transfers parts of cereal heads not threshed out by means of a further elevator, not shown, back into the threshing process, that is, conveys them back to the threshing drum 20. The chaff is ejected at the rear side of the cleaning arrangement 32. The cleaned kernels from the grain tank 42 can be unloaded by an unloading system with transverse screw conveyors and an unloading conveyor 46. The threshed out straw is conducted over an inclined straw guide plate 52 downstream of the straw shaker 26 to a straw chopper 54 which distributes it across a field by means of a distributor housing 56.

The aforementioned systems are driven by means of an internal combustion engine 48 and controlled by an operator from an operator's cab 50. The various arrangements for the threshing, conveying, cleaning, and separating are located within the support frame 12.

Figure 2:
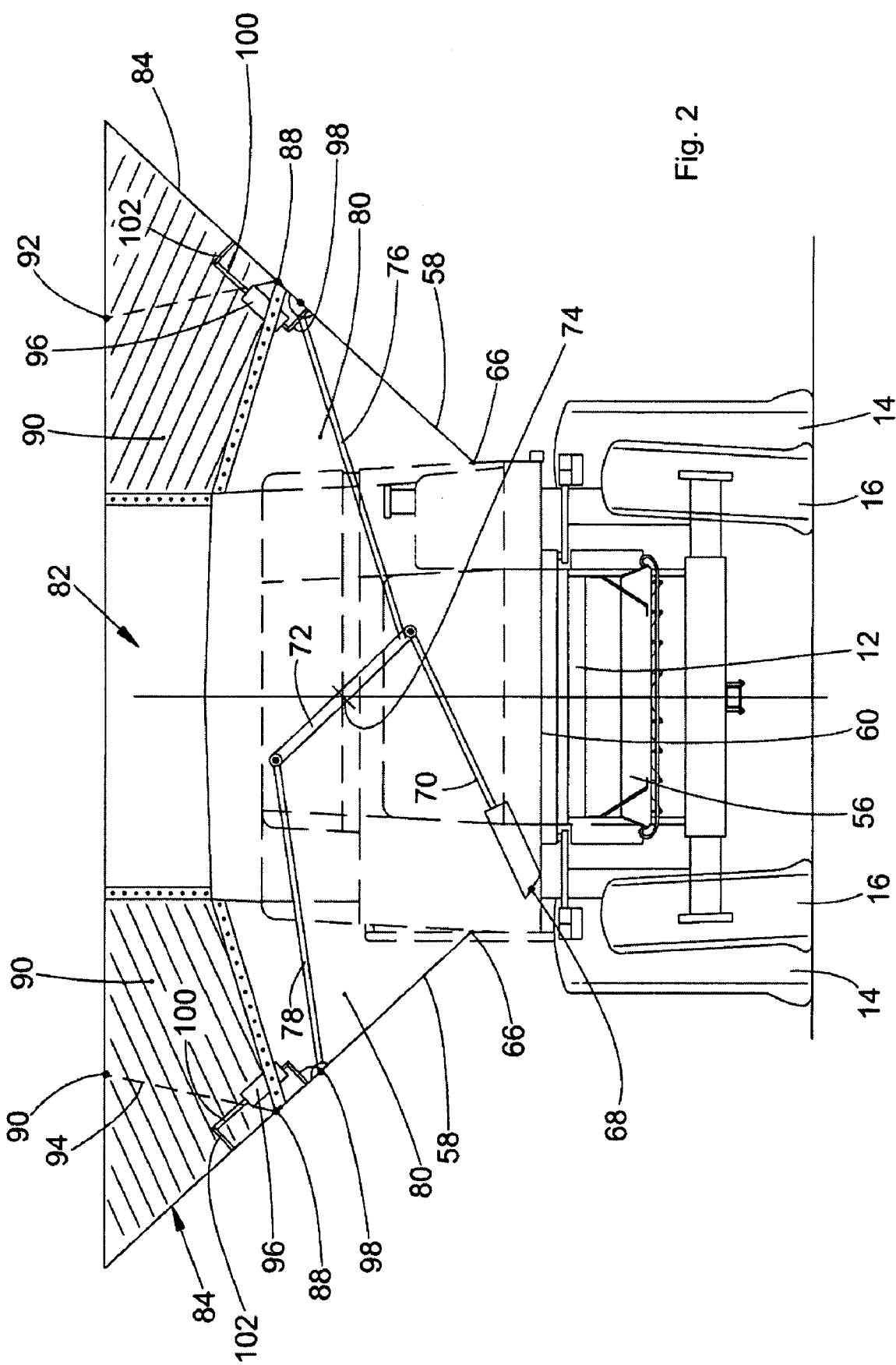
FIG. 2 shows partial section rear view of the combine of FIG. 1 with the grain tank arrangement in the extended position.
Figure 3:
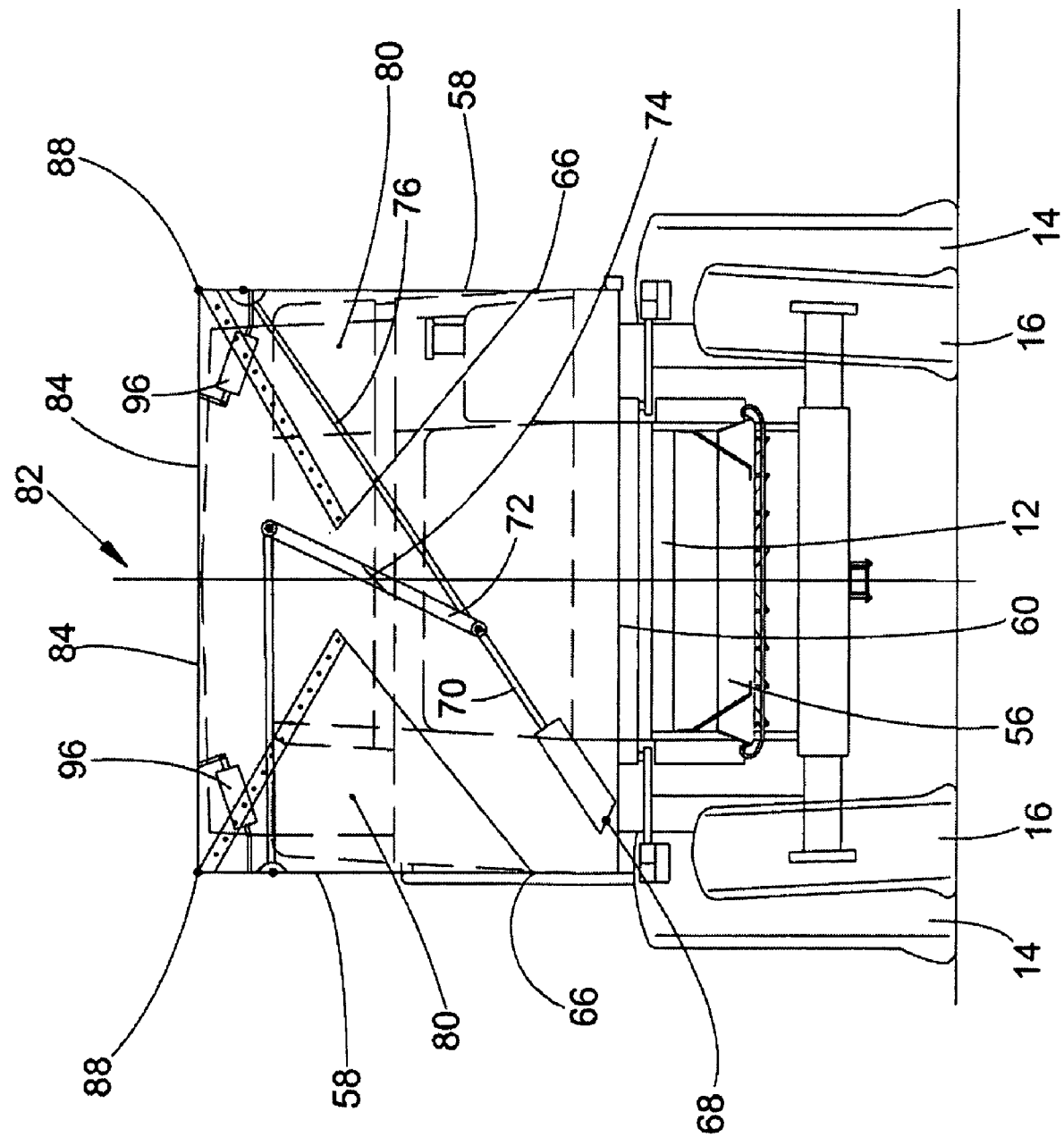
FIG. 3 shows the arrangement according to FIG. 2 with the grain tank arrangement in the retracted position.

In order to arrange the volume of the grain tank as large as possible and in order to keep the profile of the combine 10 within the allowable limits during operation on public roads and during the parking in a barn or the like, the grain tank 42 is equipped with moveable side walls 58 and moveable covers 82,84, that are shown in FIG. 2 in an extended position and in FIG. 3 in a retracted position. The grain tank 42 includes a lower floor 60 that consists of rigid material and is rigidly connected to the support frame 12, the lower floor 60 is show flat and extends horizontally and in the forward operating direction V in the embodiment shown. The floor 60 could also be formed and arched downward or upward or it may be formed in some other way. The grain tank 42 includes a front wall 62 and a rear wall 64 both of which consist of rigid material and extend vertically and transverse to the forward operating direction and are rigidly connected to the support frame 12. At is side, the grain tank 42 is bordered by side walls 58 that are rigid in themselves and are connected in joints at their lower ends by a pivot axis 66 extending horizontally and in a forward operating direction and are connected in joints at the support frame 12. The pivot axis 66 may be located above the floor 60 or along its height.

A first adjusting drive 68 preferably in the form of an electric motor or double acting hydraulic cylinder includes a housing connected in joints to the support frame 12 about an axis extending horizontally and in the forward operating direction and an adjusting element 70 that can be moved linearly. Accordingly, the adjusting element 70 can be moved by external forces. It is connected in joints about a horizontal axis extending in the forward operating direction and connected in joints at the lower end of a lever 72, it is supported at the support frame 12, fee to pivot, and at its center about a horizontal axis 74 extending in the forward operating direction. A lower strut 76 is attached to the lever 72 immediately above the adjusting element 70 about a horizontal axis extending in the forward operating direction, and is connected in joints to the right side wall 58 at its other end above the pivot axis 66 about a horizontal axis extending in the forward operating direction. At the upper end of the lever 72 an upper strut 78 is connected in joints about a horizontal axis extending in the forward operating direction, and is connected at its other end above the pivot axis 66 to an axis of the left side wall 58 about a horizontal axis extending in the forward operating direction.

Triangular end walls 80 are connected at the front and rear ends of the side walls 58, these are connected rigidly with the side walls 58 and consist of material that is rigid in itself. They are pivoted together with the side walls 58 about the pivot axis 66 and they are located in the retracted position immediately to the rear of the front walls 62 or ahead of the rear walls 64. At the vertical, inner edges, shown in FIG. 2, the lower end walls 80 are preferably provided with stops (not shown), that are supported in the extended position by interacting elements at the front wall 62 or the rear wall 64, in order to completely unload the front adjusting drive. In another possible embodiment the end walls 80 consist of material that is flexible in itself and are fastened to the walls 62 or 64 and are pre-loaded at their lower ends into the interior of the grain tank by elastic elements, such as springs or expander ropes, that are attached approximately at their center, so that they are not clamped during the retraction of the side walls 58 between the side walls 58 and the front wall 62 or rear wall 64.

Covers 82, 84 are provided that can also be moved into a retracted and an extended position in order to extend the useful volume of the grain tank 42 in the extended position upward beyond the height of the walls 62, 64 and side walls 58. Two first covers 82 extending transverse to the forward operating direction, that are rigid in themselves, are connected in joints at the upper side of the walls 62 and 64 about an axis extending transverse to the forward operating direction.

Two covers 84, extending in the forward operating direction, of material rigid in itself, are each connected in joints, about axes 88 extending in the forward operation direction, connected in joints at the upper edges of the side wall 58.

Upper end face walls 90, that consist of material that is flexible in itself, in the embodiment shown, are connected to the second cover 84 and extend vertically and transverse to the forward operating direction. The upper end face walls 90 are also fastened to the upper edges of the lower end face walls 80 and to the side edges of the first covers 82. The upper end face walls 90 of each side are connected at the center of their upper edges by means of springs or expander ropes 92 connected to each other, that have the effect that they fold inward in the retracted condition along a fold line 94 extending up to the axis 88. The second covers 84 form, together with the upper end face walls 90 and the two first covers 82 a ring-shaped upper grain tank extension that is adjacent to and connected with the side walls 58.

The covers 82, 84 are associated with their own second adjusting drives 96 that may be configured as electric motors or double acting hydraulic cylinders. Their housings are each connected to retainers 98 each of which is connected to horizontal axes extending in the forward operating direction, that are fastened at approximately half the height of the side walls 58. The adjusting elements 100 that move linearly, of the adjusting drive 96, are actuated by external forces that are connected in joints about horizontal axis extending in the forward operating direction and are connected in joints to retainers 102, that are fastened at approximately half the height of the second side covers 84.

The adjustment drives 68,96 make it possible to move the side walls 58 and the covers 82,84 between the extended position, shown in FIG. 2, in which the side walls 58 and the covers 84 extend at an angle of approximately 45° upward and outward, and the retracted position, shown in FIG. 3, in which the side walls 58 extend vertically and the covers 84 extend horizontally.

A particular sequence of the actuation of the adjustment drives 68 and 96 is not required, but for purposes of saving time it is useful to actuate both simultaneously. The first covers 82 are moved along with others by the adjustment drive 96, since the latter draws the covers 82 upward by means of the upper end face walls 90 when the second covers 84 are brought into the extended position and the first covers 82 (alone or in interaction with the springs or the expander rope 92 that pull the upper end face walls 90 inward) are also forced downward again when he second covers 84 are brought into the extended position. In the retracted position the second covers 84 cover the grain tank 42 partially or, in particular, completely, so that no rain water or other contaminants can reach it. In the extended position a considerable enlargement of the contents of the grain tank is achieved at low cost.

The grain tank volume could be increased even further by configuring the side walls 90 somewhat longer than is shown in the figures, so that the first covers 82 can be pivoted to more than 90° outward. The reverse movement can be attained by the expander rope 92 or by means of the first covers 82 of the associated adjustment drives (not shown).

The invention claimed is:

1. A combine (10) comprising:
   a support frame (12) that is movable across a field; and
   a grain tank (42) fastened to the support frame (12) that includes
      two side walls (58) that are movable with respect to the support frame between a first retracted position and a first extended position by means of an adjusting drive (68) and wherein the two sidewalls extend vertically in the first retracted position; and
      two covers (84) that adjoin an upper portion of the side walls (58) and are movable with respect to the two sidewalls between a second retracted potion and a second extended position, wherein the covers (84) are components of a ring-shaped grain tank extension that forms a standing ring in the second extended position, and further wherein the covers substantially completely cover the grain tank (42) when the covers are in the second retracted position.

2. Combine (10) according to claim 1, in which each of the side walls (58) is pivotally connected at a lower end of said each sidewall to the support frame (12) about an axis (66) extending in the forward operating direction and is pivotable about the axis (66) between the first retracted position and the first extended position wherein in said first extended position said each sidewall extends upward and outward.

3. Combine (10) according to claim 1, in which each of the covers (84) is pivotally coupled to the side walls (58) at a lower end of said each cover about an axis extending in the forward operating direction.

4. Combine (10) according to claim 1, in which the covers (84) extend upward and outward in the second extended position.

5. Combine (10) according to claim 1, in which the covers (84) extend at least approximately horizontally in the second retracted position.

6. Combine (10) according to claim 1, in which the covers (84) extend parallel to the side walls in the second extended position.

7. Combine (10) according to claim 1, wherein the grain tank (42) further comprises upper end face walls (90) that extend transverse to the forward operating direction and additional covers (82) that extend transverse to the forward operating direction, and in which the two covers (84) form the grain tank extension together with the upper end face walls (90) and the additional covers (82).

8. Combine (10) according to claim 7, in which the upper end face walls (90) comprise a flexible material.

9. Combine (10) according to claim 8, in which the upper end face walls (90) are connected to each other by springs extending in the forward operating direction or by elastic ropes (92).

10. Combine (10) according to claim 7, in which each of the additional covers (82) extending transverse to the forward operating condition is pivotable about an axis (86) that extends transverse to the forward operating direction.

11. Combine (10) according to claim 1, in which the side walls (58) are connected to the lower end face walls (80) that extend transverse to the forward operating condition and that move with the side wall (58) between the first retracted position and the first extended position.

12. Combine (10) according to claim 1, in which the side walls (58) are movable by the adjusting drive (68) and the covers (84) are movable by a further adjusting drive (96).

13. Combine (10) according to claim 12, in which the adjusting drive (68) and the further adjusting drive (96) are simultaneously drivable.

14. Combine (10) according to claim 1, in which the grain tank (42) includes a front wall (62) extending vertically and transverse to the forward operating direction and a rear wall (64) extending vertically and transverse to the forward operating direction, and the side walls (58) extend in the forward operating direction between the front wall (62) and the rear wall (64).

* * * * *